Dec. 9, 1952     W. A. LARSON     2,620,512
APPARATUS FOR MOLDING DENTAL INLAYS
Filed Oct. 18, 1948

WILLIAM A. LARSON
INVENTOR.

BY
*Allen E. Hambly*
ATTORNEY

UNITED STATES PATENT OFFICE 2,620,512

APPARATUS FOR MOLDING DENTAL INLAYS

William A. Larson, Los Angeles, Calif.

Application October 18, 1948, Serial No. 55,111

2 Claims. (Cl. 18—5.7)

This invention relates generally to molding apparatus, and is directed particularly to improvements in apparatus for molding dental plastic inlays and the like.

The quality of a dental plastic inlay is dependent to a great degree on the density or compactness of the plastic in the finished product, and in order to achieve this it is customary to subject the plastic to pressure during the molding operation. Various types of pressure molding apparatus have heretofore been developed and used for this purpose, but for various reasons they have been incapable of consistently producing inlays of uniformly high quality.

It is a principal object of this invention to provide pressure molding apparatus so constructed and arranged as to be capable of producing dental plastic inlays and the like of a uniformly high degree of density.

Another object of this invention is to provide apparatus of the foregoing type which enables the production of inlays in less time and with less effort than has heretofore been possible.

A more specific object is to provide apparatus of the foregoing type which may be employed for the dual purpose of molding an inlay under pressure and of thereafter ejecting the investment material and its imbedded inlay from the investment flask.

A still further object is to provide pressure molding apparatus for forming dental plastic inlays and the like, incorporating a novel and improved investment flask.

A still further object is to provide pressure molding apparatus incorporating novel and improved means permitting removal of the investment flask from the apparatus immediately upon completion of the molding operation and prior to complete cooling of the inlay, whereby a number of inlays may be molded in rapid succession and set aside to cool.

A still further object is to provide an improved investment flask and associated means facilitating the ejection of investment material and its imbedded inlay from the flask.

Other objects and advantages of the present invention will be apparent from the following detailed description of a preferred embodiment of the invention, taken in conjunction with the accompanying drawing wherein.

Figure 2:
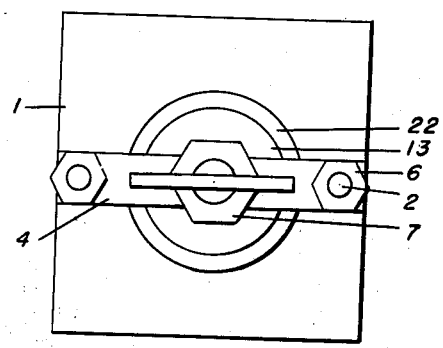
Figure 2 is a top plan view of the device.
Figure 3:
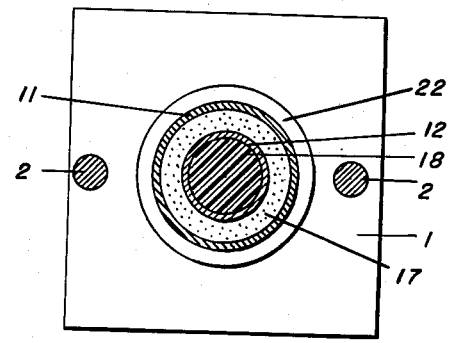
Figure 3 is a transverse sectional view taken on line 3—3 of Figure 1.
Figure 1:
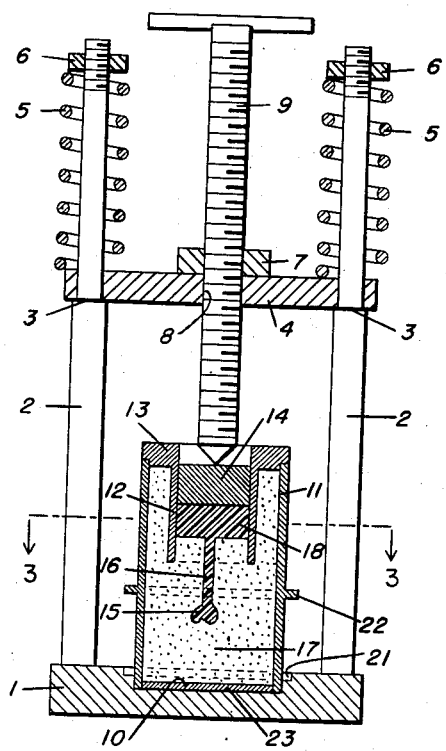
Figure 1 is a central longitudinal sectional view of a device constructed in accordance with my invention, the parts being shown in position for the injection of the plastic material into the inlay pattern.

Referring to Figures 1 to 3, there is shown a press comprising a base 1 on which is mounted a pair of upright posts 2, the upper portions of which are of reduced diameter providing upwardly facing shoulders 3. A cross bar 4 spans the space between the posts 2 and is slidably mounted on the reduced upper portions thereof, normally resting on the shoulders 3 and yieldingly urged downwardly thereagainst by compression springs 5 interposed between the cross bar and nuts 6. The nuts are adjustable on the upper threaded ends of the rods, whereby the downward spring pressure exerted against the cross bar may be varied. A nut 7 is secured to or formed integral with the cross bar 4 in axial alignment with a central opening 8 in the cross bar, through which extends a threaded pressure screw 9 having threaded engagement with the nut 7.

A circular recess 10 is formed in the upper surface of the base 1 in concentric relation to the pressure screw 9, and serves to centralize an investment flask 11 on the base. An injection cylinder 12 is supported on the upper end of the flask by a flange 13, and projects downwardly into the flask in concentric relation thereto. A free piston 14 has a close sliding fit in the cylinder, and is adapted to be engaged by the pressure screw 9 and forced downwardly thereby.

Prior to placing the flask 11 in the press, an inlay cavity 15 and a sprue hole 16 are formed in a conventional manner in a body of investment material 17 such as plaster of Paris, which substantially fills the flask. A quantity of plastic material 18 slightly in excess of that necessary to fill the cavity 15 and the sprue hole 16 is placed in the cylinder 12 in heated, plastic condition, and is adapted to be forced downwardly through the sprue hole and into the cavity to form the inlay 18a (Fig. 4) by exerting downward pressure on the piston 14 by the pressure screw 9.

During the application of downward pressure to the plastic material, the upward reaction force exerted on the nut 7 and the cross bar 4 is yieldingly resisted by the springs 5, the resistance of which may be varied by adjustment of the nuts 6, in order to maintain a predetermined pressure on the plastic material during the hardening period. As soon as the plastic material has cooled sufficiently to solidify, the pressure screw 9 is retracted upwardly to permit removal of the flask 11 and cylinder 12 as a unit from the press. The unit may then be set aside for further cooling, and in the meantime the press may be employed to mold additional inlays in the manner described above.

Figure 4:
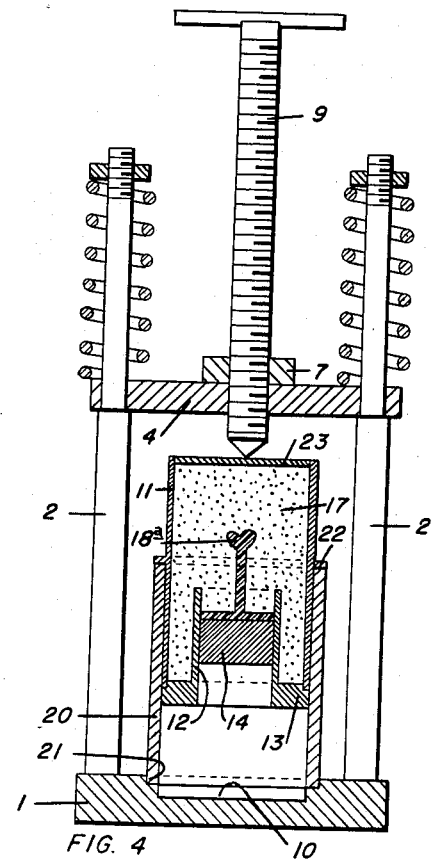
Figure 4 is a view similar to Figure 1 but showing the investment flask in inverted position preparatory to ejection of the investment material.

When it is desired to remove an inlay from its investment flask, a cylinder 20 (Figure 4) is mounted on the base 1 of the press, the upper surface of the base being provided with a second circular recess 21 concentric with the recess 10 and serving to centralize the cylinder with respect to the pressure screw 9. It will be observed that a projection 22 is provided on the outer surface of the flask 11 intermediate its ends, the projection being either in the form of a continuous annular flange or a series of circumferentially spaced lugs. The inner diameter of the cylinder 20 is slightly greater than the outer diameter of the flask 11, thus permitting insertion of the flask into the cylinder in inverted position, as shown in Figure 4. The projection 22 on the flask engages the upper surface of the cylinder and thus supports the flask with the normally upper surface of the flange 13 spaced from the base 1.

The base 23 of the investment flask 9 is separate from the cylindrical wall thereof and slidable therein, and is sufficiently rigid and strong to serve as a piston and transmit downward pressure uniformly over the entire area of the investment material 17 upon application of downward pressure on the base by the pressure screw 9. The bond between the investment material and the inner wall of the flask is thus broken, permitting the investment material with the imbedded inlay 18a, injection cylinder 12 and piston 14 to be ejected from the flask. The investment material may then be broken in the customary manner to remove the inlay.

The dental molding apparatus described herein possesses a number of advantages over apparatus of this type previously available. It has heretofore been customary to provide two types of presses—one for use in molding the inlays and a different type for ejecting the investment material and its imbedded inlay from the flask. In contradistinction to this practice, the instant invention makes possible the use of a single press for performing both functions. This feature results partly from the construction of the press, and particularly of the base thereof, which is provided with means for selectively supporting either a flask or a flask-supporting cylinder in concentric relation to the pressure screw.

The provision of an injection cylinder with a closely-fitting piston separate from the pressure screw also contributes to an important degree to the above-mentioned result. The piston prevents by-passing of the inlay material while in plastic form, and thus avoids any attendant reduction in pressure applied to the material. By making it possible to maintain uniform pressure of predetermined magnitude on the inlay during the molding process, inlays of uniform quality can be produced consistently.

Having fully described my invention, it is to be understood that I do not wish to be limited to the details herein set forth, but my invention is of the full scope of the appended claims.

I claim:

1. Apparatus for molding dental inlays and the like comprising a base, a pair of concentric centering surfaces on the upper side of said base, a flask adapted to seat in upright position on said base and centered thereon by one of said centering surfaces, shoulder means on the exterior of said flask intermediate its ends, a pressure screw adjustably mounted on said base coaxial with said flask and adapted, when the flask is in upright position, to inject inlay material into a mold cavity in said flask, and a support member adapted to be mounted on said base and centered thereon by the other of said centering surfaces and to engage said shoulder means to support said flask in inverted position spaced from said base, whereby to enable said screw to eject the contents of said flask.

2. Apparatus for molding dental inlays and the like comprising: a press including a base and a pressure screw adjustably mounted thereon for axial movement toward and away from said base; a mold flask unit comprising a cylindrical shell having shoulder means on the exterior thereof intermediate its ends and having end walls, one end wall being slidably fitted in said shell and the other end wall supporting a cylinder coaxially within said shell, and a free piston slidably mounted in said cylinder; first means formed on said base for centering said shell and said cylinder in axial alignment with said pressure screw; and second means formed on said base concentric with said first means adapted to center a support member engageable with said shoulder means to support said shell in inverted position spaced from said base.

WILLIAM A. LARSON.

REFERENCES CITED

The following references are of record in the file of this patent:

UNITED STATES PATENTS

| Number | Name | Date |
|---|---|---|
| 541,529 | Genese | June 25, 1895 |
| 2,049,011 | Joannides | July 28, 1936 |
| 2,334,078 | Feinberg | Nov. 9, 1943 |
| 2,359,152 | Pryor et al. | Sept. 26, 1944 |
| 2,421,693 | Hordes | June 3, 1947 |
| 2,442,847 | Galley | June 8, 1948 |
| 2,474,105 | Hordes | June 21, 1949 |